(12) United States Patent
Matikkala (10) Patent No.: US 12,539,093 B2
(45) Date of Patent: Feb. 3, 2026

(54) DUAL-ENERGY IMAGING DEVICE AND METHOD

(71) Applicant: Detection Technology Oyj, Oulu (FI)

(72) Inventor: Mikko Matikkala, Oulu (FI)

(73) Assignee: DETECTION TECHNOLOGY OYJ, Oulu (FI)

(*) Notice: Subject to any disclaimer, the term of this patent is extended or adjusted under 35 U.S.C. 154(b) by 192 days.

(21) Appl. No.: 18/043,549

(22) PCT Filed: Sep. 28, 2021

(86) PCT No.: PCT/FI2021/050636
§ 371 (c)(1),
(2) Date: Feb. 28, 2023

(87) PCT Pub. No.: WO2022/069796
PCT Pub. Date: Apr. 7, 2022

(65) Prior Publication Data
US 2023/0263491 A1    Aug. 24, 2023

(30) Foreign Application Priority Data
Sep. 29, 2020 (EP) .................................. 20198877

(51) Int. Cl.
*A61B 6/00* (2024.01)
*A61B 6/40* (2024.01)
*G01T 1/16* (2006.01)

(52) U.S. Cl.
CPC ............ *A61B 6/482* (2013.01); *A61B 6/4035* (2013.01); *G01T 1/16* (2013.01)

(58) Field of Classification Search
None
See application file for complete search history.

(56) References Cited

U.S. PATENT DOCUMENTS 11,337,665 B2 * 5/2022 Maidment ............... A61K 47/02
2009/0147910 A1 * 6/2009 Edic ...................... G01N 23/046
378/5

(Continued)

FOREIGN PATENT DOCUMENTS

CN        110476249 A       11/2019
WO        2016047711 A1      3/2016

OTHER PUBLICATIONS

European Patent Office, Extended European Search Report Issued in Application No. 20198877.1, Mar. 1, 2021, Germany, 11 pages.

(Continued)

*Primary Examiner* — Marcus H Taningco
(74) *Attorney, Agent, or Firm* — McCoy Russell LLP (57) ABSTRACT

It is an object to provide a device and a method for x-ray and/or gamma ray detection. According to an embodiment, a device comprises: a detector comprising a plurality of pixels, wherein the plurality of pixels comprises a first subset of pixels configured to detect incident x-ray or gamma ray radiation in a first energy range and a second subset of pixels configured to detect incident x-ray or gamma ray radiation in a second energy range; a processing unit configured to: obtain a signal from each pixel in the plurality of pixels; obtain a radiation intensity value for each pixel in the plurality of pixels based on the signal of each pixel; calculate a radiation intensity estimate in the first energy range for at least one pixel in the second subset of pixels. A device and a method are provided.

11 Claims, 5 Drawing Sheets

(56) References Cited

U.S. PATENT DOCUMENTS

2010/0278296 A1* 11/2010 Edic .................. G21K 1/10
                                                    378/19
2012/0145910 A1   6/2012 Suyama
2016/0038112 A1* 2/2016 Wiemker ............ G06T 5/50
                                                    382/132
2016/0209524 A1   7/2016 Laurence et al.

OTHER PUBLICATIONS

ISA European Patent Office, International Search Report Issued in Application No. PCT/FI2021/050636, Nov. 23, 2021, WIPO, 2 pages.
International Bureau of WIPO, International Preliminary Report on Patentability Issued in Application No. PCT/FI2021/050636, Nov. 29, 2022, WIPO, 9 pages.
State Intellectual Property Office of the People's Republic of China, Office Action and Search Report Issued in Application No. 2021800066742.2, Dec. 3, 2025, 16 pages. (Submitted with Machine Translation).

* cited by examiner

DUAL-ENERGY IMAGING DEVICE AND METHOD

CROSS REFERENCE TO RELATED APPLICATIONS

The present application is a U.S. National Phase of International Application No. PCT/FI2021/050636 entitled "DUAL-ENERGY IMAGING DEVICE AND METHOD," and filed on Sep. 28, 2021. International Application No. PCT/FI2021/050636 claims priority to European Patent Application No. 20198877.1 filed on Sep. 29, 2020. The entire contents of each of the above-listed applications are hereby incorporated by reference for all purposes.

TECHNICAL FIELD

The present disclosure relates to the field x-ray and gamma ray detectors, and more particularly to a device and a method for x-ray and/or gamma ray detection.

BACKGROUND

In dual-energy imaging, attenuation of electromagnetic radiation, such as x-rays, of an object in two energy ranges can be obtained. This information can then be used to generate a more detailed image of the object compared to if only a single energy range was used.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide a device and a method for x-ray and/or gamma ray detection. The foregoing and other objects are achieved by the features of the independent claims. Further implementation forms are apparent from the dependent claims, the description and the figures.

According to a first aspect, a device comprises: a detector comprising a plurality of pixels, wherein the plurality of pixels comprises a first subset of pixels configured to detect incident x-ray or gamma ray radiation in a first energy range and a second subset of pixels configured to detect incident x-ray or gamma ray radiation in a second energy range, wherein the second energy range is a subrange of the first energy range; and a processing unit coupled to the detector, configured to: obtain a signal from each pixel in the plurality of pixels; calculate a radiation intensity value for each pixel in the plurality of pixels based on the signal of each pixel; and calculate a radiation intensity estimate in the first energy range for at least one pixel in the second subset of pixels using the obtained radiation intensity value of the at least one pixel in the second subset of pixels and the obtained radiation intensity values of at least two pixels in the first subset of pixels. The device may, for example, increase the imaging resolution by estimating the missing information in the first energy range.

In an implementation form of the first aspect, the processing unit is further configured to calculate the radiation intensity estimate by performing: calculate an attenuation factor for each pixel pair in a plurality of pixel pairs in the plurality of pixels, wherein each pixel pair in the plurality of pixel pairs comprises a pixel in the first subset of pixels and a pixel in the second subset of pixels; calculate a filtered attenuation factor using a spatial filter and the attenuation factors of the plurality of pixel pairs; and calculate the radiation intensity estimate in the first energy range using the obtained radiation intensity value of the at least one pixel in the second subset of pixels and the filtered attenuation factor. The device may, for example, efficiently calculate the estimate by using the attenuation factors of other pixels.

In a further implementation form of the first aspect, the spatial filter comprises a spatial low-pass filter, a moving average filter, a moving median filter, a weighted median filter, or a gaussian filter. The device may, for example, efficiently calculate the filtered attenuation factor.

In a further implementation form of the first aspect, the processing unit is further configured to calculate a radiation intensity estimate in the second energy range for at least one pixel in the first subset of pixels using the obtained radiation intensity value of the at least one pixel in the first subset of pixels and the obtained radiation intensity values of at least two pixels in the second subset of pixels. The device may, for example, further increase the imaging resolution by estimating the missing information in the second energy range.

In a further implementation form of the first aspect, the detector further comprises a filter arranged to block at least part of the incident x-ray or gamma ray radiation outside the second energy range from entering the second plurality of pixels. The device may, for example, efficiently prevent the incident ray radiation outside the second energy range from entering the second plurality of pixels. Thus, the second plurality of pixels can be used for dual-energy imaging.

In a further implementation form of the first aspect, the filter further comprises a plurality of apertures arranged to allow the incident x-ray or gamma ray radiation to enter the first plurality of pixels. The device may, for example, allow radiation to enter the first plurality of pixels while preventing the incident ray radiation outside the second energy range from entering the second plurality of pixels. Thus, the first and second plurality of pixels can be used for dual-energy imaging.

In a further implementation form of the first aspect, the first subset of pixels and the second subset of pixels are spatially arranged into an alternating pattern. The device may, for example, measure the incident radiation in the first energy range using every other pixel and measure the incident radiation in the second energy range using every other pixel.

According to a second aspect, a dual energy x-ray or gamma ray imaging apparatus comprises the device according to the first aspect.

According to a third aspect, a method for imaging using a detector comprising a plurality of pixels is provided, wherein the plurality of pixels comprises a first subset of pixels configured to detect incident x-ray or gamma ray radiation in a first energy range and a second subset of pixels configured to detect incident x-ray or gamma ray radiation in a second energy range, wherein the second energy range is a subrange of the first energy range, the method comprising: obtaining a signal from each pixel in the plurality of pixels; calculating a radiation intensity value for each pixel in the plurality of pixels based on the signal of each pixel; and calculating a radiation intensity estimate in the first energy range for at least one pixel in the second subset of pixels using the obtained radiation intensity value of the at least one pixel in the second subset of pixels and the obtained radiation intensity values of at least two pixels in the first subset of pixels. The method may enable, for example, increasing the imaging resolution by estimating the missing information in the first energy range.

In an implementation form of the third aspect, the calculating the radiation intensity estimate comprises: calculating an attenuation factor for each pixel pair in a plurality of pixel pairs in the plurality of pixels, wherein each pixel pair in the plurality of pixel pairs comprises a pixel in the first subset of pixels and a pixel in the second subset of pixels; calculating a filtered attenuation factor using a spatial filter and the attenuation factors of the plurality of pixel pairs; calculating the radiation intensity estimate in the first energy range using the obtained radiation intensity value of the at least one pixel in the second subset of pixels and the filtered attenuation factor. The method may enable, for example, efficiently calculating the estimate by using the attenuation factors of other pixels.

In a further implementation form of the third aspect, the spatial filter comprises a spatial low-pass filter, a moving average filter, a moving median filter, a weighted median filter, or a gaussian filter. The method may enable, for example, efficiently calculating the filtered attenuation factor.

In a further implementation form of the third aspect, the method further comprises calculating a radiation intensity estimate in the second energy range for at least one pixel in the first subset of pixels using the obtained radiation intensity value of the at least one pixel in the radiation first subset of pixels and the obtained radiation intensity values of at least two pixels in the second subset of pixels. The method may enable, for example, further increasing the imaging resolution by estimating the missing information in the second energy range.

According to a fourth aspect, a computer program product comprises program code configured to perform the method according to the third aspect when the computer program product is executed on a computer.

Many of the attendant features will be more readily appreciated as they become better understood by reference to the following detailed description considered in connection with the accompanying drawings.

DESCRIPTION OF THE DRAWINGS

In the following, example embodiments are described in more detail with reference to the attached figures and drawings, in which.

In the following, identical reference signs refer to similar or at least functionally equivalent features.

DETAILED DESCRIPTION

In the following description, reference is made to the accompanying drawings, which form part of the disclosure, and in which are shown, by way of illustration, specific aspects in which the present disclosure may be placed. It is understood that other aspects may be utilised, and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Figure 1:
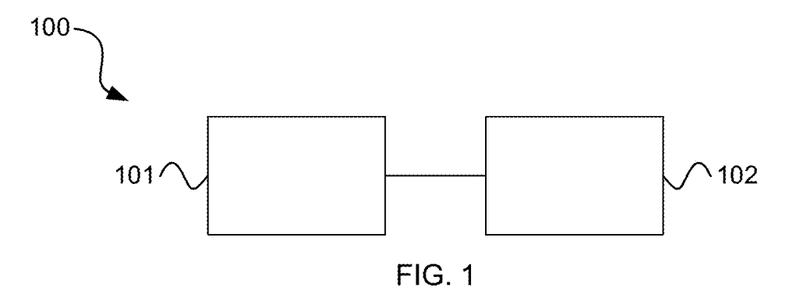
FIG. 1 illustrates a schematic representation of a device according to an embodiment.

FIG. 1 illustrates a schematic representation of a device 100 according to an embodiment.

According to an embodiment, the device 100 comprises a detector 101 comprising a plurality of pixels. The plurality of pixels may comprise a first subset of pixels configured to detect incident x-ray or gamma ray radiation in a first energy range and a second subset of pixels configured to detect incident x-ray or gamma ray radiation in a second energy range. The second energy range may be a subrange of the first energy range.

The plurality of pixels may be spatially arranged into, for example, a one-dimensional row or a two-dimensional array or matrix.

The first energy range may correspond to, for example, so-called total energy (TE) in dual-energy x-ray imaging.

The second energy range may correspond to, for example, so-called high energy (HE) in dual-energy x-ray imaging. Since the HE energy range is a subrange of the TE energy range, the device 100 may obtain so-called low energy (LE) information by subtracting the HE events from the TE events. This way, the device 100 may perform dual-energy imaging by using the LE and the HE signals.

The device 100 may further comprise a processing unit 102 coupled to the detector 101. The processing unit 102 may be configured to obtain a signal from each pixel in the plurality of pixels.

The processing unit 102 may perform pre-processing based on the signals obtained from the plurality of pixels. The processing unit 102 may then use the pre-processed signals for the consecutive operations. For example, the processing unit 102 may perform denoising and/or dark-frame subtraction.

The signal from each pixel may be proportional to the intensity of the incident radiation. For example, each signal may be proportional to the number of events occurred in the pixel due to the incident radiation.

The processing unit 102 may be further configured to obtain a radiation intensity value for each pixel in the plurality of pixels based on the signal of each pixel.

The processing unit 102 may obtain the radiation intensity value by, for example, performing an analogue-to-digital conversion on the signal and scaling the result of the conversion appropriately. Alternatively or additionally, the processing unit 102 may perform other operations and/or computations in order to obtain the radiation intensity value.

The radiation intensity value may correspond to the intensity of the incident radiation at the location of the pixel. The radiation intensity value may also be referred to as an event count or similar. The obtained radiation intensity values may also be referred to as measured radiation intensity values, detected radiation intensity values, or similar.

The processing unit 102 may also be referred to as a signal processing unit, a computing unit, or similar.

The processing unit 102 may be further configured to calculate a radiation intensity estimate in the first energy range for at least one pixel in the second subset of pixels using the obtained radiation intensity value of the at least one pixel in the second subset of pixels and the obtained radiation intensity values of at least two pixels in the first subset of pixels.

In some embodiments, the processing unit 102 may be further configured to calculate a radiation intensity estimate in the first energy range each pixel in the second subset of pixels using the obtained radiation intensity value of each pixel in the second subset of pixels and the obtained radiation intensity values of at least two pixels in the first subset of pixels.

Since the second subset of pixels is able to detect only incident radiation in the second energy range, information about the intensity of the incident radiation in the first energy range at the locations of the pixels in the second subset may be lost. Thus, the imaging resolution may be reduced. The device 100 may approximate the lost information by using the imaging information from other pixels as disclosed above. Thus, the device 100 may improve the imaging quality.

Each pixel in the plurality of pixels may be, for example, configured to detect the incident x-ray and/or gamma ray radiation in the vicinity of the pixel.

The processing unit 102 may be, for example, electrically coupled to each pixel in the plurality of pixels. In some embodiments, the processing unit 102 may be implemented as an application-specific integrated circuit (ASIC). In some further embodiments, the ASIC may be integrated with the detector 101 into a single unit. In other embodiments, the processing unit 102 may be embodied in a separate device from the detector 101.

The processing unit 102 may comprise at least one processor. The at least one processor may comprise, for example, one or more of various processing devices, such as a co-processor, a microprocessor, a controller, a digital signal processor (DSP), a processing circuitry with or without an accompanying DSP, or various other processing devices including integrated circuits such as, for example, an application-specific integrated circuit (ASIC), a field-programmable gate array (FPGA), a microcontroller unit (MCU), a hardware accelerator, a special-purpose computer chip, or the like.

The processing unit 102 may further comprise a memory. The memory may be configured to store, for example, computer programs and the like. The memory may comprise one or more volatile memory devices, one or more non-volatile memory devices, and/or a combination of one or more volatile memory devices and non-volatile memory devices. For example, the memory may be embodied as magnetic storage devices (such as hard disk drives, floppy disks, magnetic tapes, etc.), optical magnetic storage devices, and semiconductor memories (such as mask ROM, PROM (programmable ROM), EPROM (erasable PROM), flash ROM, RAM (random access memory), etc.).

As a person skilled in the art can appreciate, when the processing unit 102 is configured to implement some functionality, some component and/or components of the processing unit 102, such as the at least one processor and/or the memory, may be configured to implement this functionality. Furthermore, when the at least one processor is configured to implement some functionality, this functionality may be implemented using program code comprised, for example, in the memory.

The device 100 may be embodied in, for example, a dual energy x-ray or gamma ray imaging apparatus.

Figure 2:
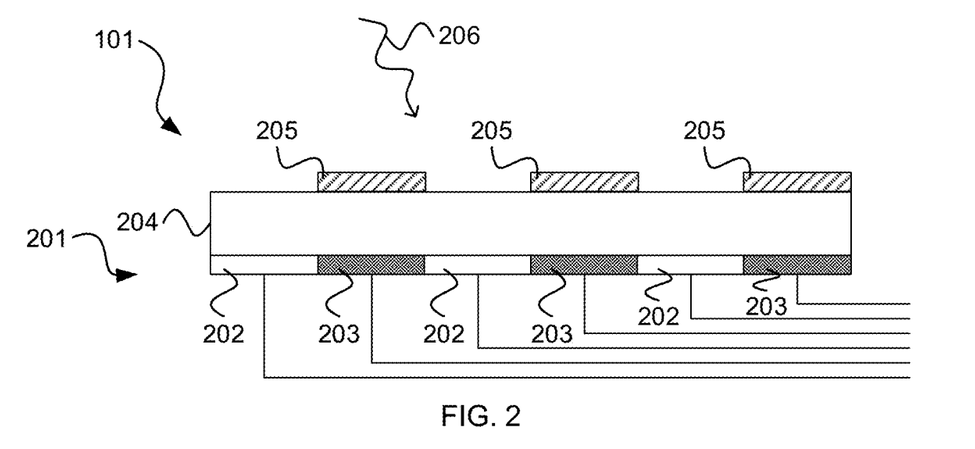
FIG. 2 illustrates a schematic representation of a detector according to an embodiment.

FIG. 2 illustrates a schematic representation of a detector 101 according to an embodiment.

According to an embodiment, the detector 101 further comprises a filter 205 arranged to block at least part of the incident x-ray or gamma ray radiation 206 outside the second energy range from entering the second plurality of pixels 203.

According to an embodiment, the filter 205 further comprises a plurality of apertures arranged to allow the incident x-ray or gamma ray radiation 206 to enter the first plurality of pixels 202.

For example, in the embodiment of FIG. 2, the plurality of pixels 201 comprises the first subset 202 and the second subset 203 of pixels. The pixels in the second subset of pixels 203 are each covered by the filter 205. Thus, the filter 205 comprises apertures for the first plurality of pixels 202.

In the embodiment of FIG. 2, the detector further comprises a scintillator layer 204. The scintillator layer 204 may convert the incident radiation 206 to lower energy electromagnetic radiation. The lower energy electromagnetic radiation can then be detected by, for example, photodiodes corresponding to the plurality of pixels 201.

The filter 205 may comprise, for example, copper. Thickness of the filter 205 may be, for example, in the range 0.1-10 millimetres (mm), such as 1.5 mm.

The filter 205 may also be referred to as a high-energy filter, an x-ray filter, or similar.

The device 100 may obtain dual-energy information about the incident radiation 206 by measuring the incident radiation 206 using one type of scintillator 204, since the first subset of pixels 202 is not covered by the filter 205 and the second subset of pixels 203 is covered by the filter 205.

Since the first subset of pixels 202 are not covered by the filter 205, the pixels can obtain total energy (TE) signal. On the other hand, since the second subset of pixels 203 is covered by the filter 205, the pixels can obtain, for example, a high energy (HE) signal.

The TE/HE signals can be converted, by for example the processing unit 102, to a low energy (LE) signal by subtracting the HE signal from the TE signal. The LE and HE signals can then be used in, for example, dual-energy (DE) imaging algorithms. Alternatively, the dual-energy algorithms may be modified to use TE and HE signals.

Figure 3:
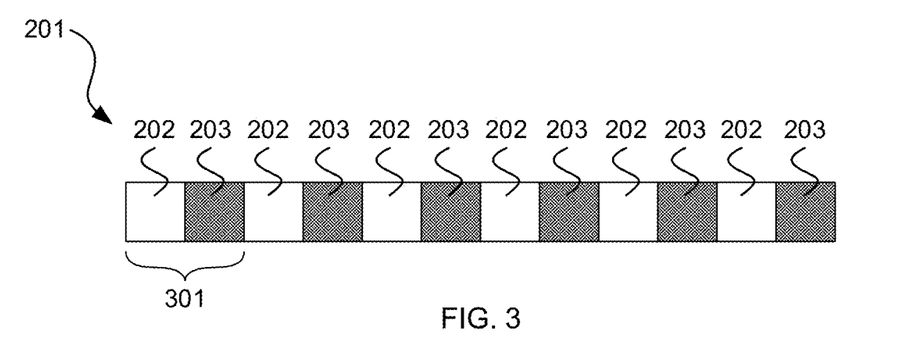
FIG. 3 illustrates a schematic representation of a detector according to another embodiment.

FIG. 3 illustrates a schematic representation of a detector 101 according to another embodiment.

According to an embodiment, the first subset of pixels 202 and the second subset of pixels 203 are spatially arranged into an alternating pattern.

For example, in the embodiment of FIG. 3, every other pixel is in the first subset of pixels 202 and every other pixel in the second subset of pixels 203.

In some embodiments, the plurality of pixels 201 may be arranged into a one-dimensional row. The object to be imaged may then be moved, by for example a conveyor belt, with respect to the plurality of pixels 201 in order to obtain a two-dimensional image of the object. This may be referred to as line scanning and it can be used for low-cost imaging solutions.

In some embodiments, the pixels in the first subset 202 and in the second subset 203 may be coupled to a single ASIC. The processing unit 102 may comprise the ASIC. However, the signal level difference between first subset 202 and the second subset 203 may be large. Thus, if only one gain setting can be used in the ASIC the signal to noise ratio cannot be optimized both for both subsets. Therefore, in some embodiments, the first subset of pixels 202 may be coupled to a first ASIC and the second subset of pixels 203 may be coupled to a second ASIC. This can allow ASIC gain tuning per energy range. However, this may require two times smaller sensor fill-factor per pixel, which may lower the overall signal level.

Figure 4:
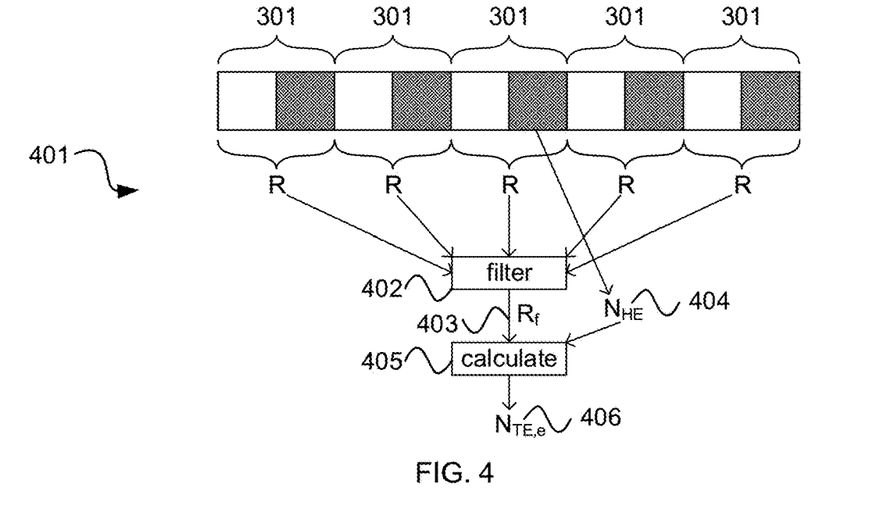
FIG. 4 illustrates a schematic representation of radiation intensity value estimation according to an embodiment.

FIG. 4 illustrates a schematic representation of radiation intensity value estimation according to an embodiment.

According to an embodiment, the processing unit 102 is further configured to calculate the radiation intensity estimate by performing the following operations.

The processing unit 102 may calculate an attenuation factor R 401 for each pixel pair 301 in a plurality of pixel pairs in the plurality of pixels. Each pixel pair 301 in the plurality of pixel pairs may comprise a pixel in the first subset 202 and a pixel in the second subset 203.

The number of pixel pairs 301 for which the processing unit 102 calculates the attenuation factor R 401 may vary. For example, the number of pixel pairs 301 in the plurality of pixel pairs may be greater than three, such as five, six, seven, or nine.

The attenuation factor R 401 may quantify how much the radiation intensity has attenuated in the second subset of pixels 203 compared to the first subset of pixels 202. The attenuation factor R 401 may be calculated, for example, as $R=N_{HE}/N_{TE}$, where $N_{TE}$ is the obtained radiation intensity value of the pixel in the first subset of pixels 202 in the pixel pair 301 and $N_{HE}$ is the obtained radiation intensity value of the pixel in the second subset of pixels 203 in the pixel pair 301.

$N_{TE}$ may also be referred to as an obtained/measured TE count and $N_{HE}$ may also be referred to as an obtained/measured a HE count. Herein, TE count may refer to the number of events in the first energy range due to the incident radiation 206 and HE count may refer to the number of events in the second energy range due to the incident radiation 206.

The processing unit 102 may calculate a filtered attenuation factor $R_f$ 403 using a spatial filter 402 and the attenuation factors R 401 of the plurality of pixel pairs 301.

The processing unit 102 may calculate the radiation intensity estimate in the first energy range $N_{TE,e}$ 406 using the obtained radiation intensity value $N_{HE}$ 404 of the at least one pixel in the second subset of pixels and the filtered attenuation factor $R_f$ 403. For example, the processing unit 102 may calculate the radiation intensity estimate 406 using $N_{TE,e}=N_{HE}/R_f$.

According to an embodiment, the spatial filter 402 comprises a spatial low-pass filter, a moving average filter, a moving median filter, a weighted median filter, or a gaussian filter. An appropriate spatial filter type and parameters related to the spatial filter may vary depending on the imaging application.

The spatial filter 402 may be, for example, one dimensional or two dimensional. For example, if the plurality of pixels 201 are spatially arranged into a one-dimensional array, the spatial filter 402 may be one dimensional. On the other hand, if the plurality of pixels 201 are spatially arranged into a two-dimensional array, the spatial filter 402 may be two dimensional.

The filter 402 may apply a weighting when calculating the filtered attenuation factor $R_F$ 403. For example the filter 402 may weight more attenuation factors R 401 of pixel pairs 301 that are closer to the pixel for which the radiation intensity estimate 406 is calculated.

The processing unit 102 may calculate the filtered attenuation factor $R_f$ 403 by performing, for example, a convolution operation between the spatial filter 402 and the attenuation factors R 401. Alternatively, the processing unit 102 may perform some other computational operation, for example, in the case of a non-linear spatial filter.

In other embodiments, the processing unit 102 may calculate the radiation intensity estimate in other ways. For example, the processing unit 102 may filter the obtained radiation intensity values from the first 202 and/or second subset of pixels 203 and calculate the filtered attenuation factor $R_f$ 403 based on the filtered intensity values.

According to an embodiment, the processing unit 102 is further configured to calculate a radiation intensity estimate in the second energy range for at least one pixel in the first subset of pixels 202 using the obtained radiation intensity value of the at least one pixel in the first subset of pixels 202 and the obtained radiation intensity values of at least two pixels in the second subset of pixels. Thus, the processing unit 102 may, for example, calculate HE count estimates for pixels in the first subset of pixels 202. For example, the processing unit 102 may calculate the filtered attenuation factor $R_f$ as disclosed herein and then calculate the HE count estimate as $N_{HE,e}=R_f \times N_{TE}$.

Figure 5:
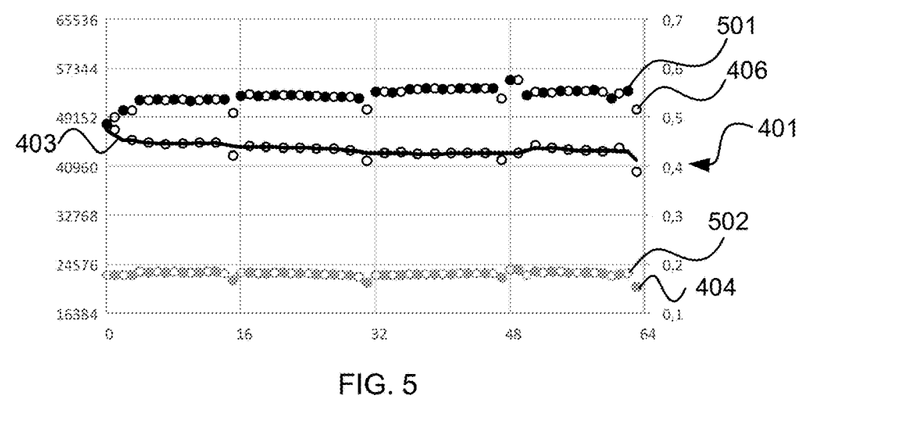
FIG. 5 illustrates a plot representation of TE and HE counts and attenuation factors according to an embodiment.

FIG. 5 illustrates a plot representation of TE and HE counts and attenuation factors according to an embodiment.

In the embodiment of FIG. 5, measured 501 and estimated 406 TE counts as well as measured 404 and estimated 502 HE counts are illustrated. Measured counts are illustrated by filled in circles and estimated counts are illustrated by non-filled circles.

Attenuation factors 401 are illustrated by empty circles in the embodiments of FIG. 5. Each attenuation factor has been calculated as $R=N_{HE}/N_{TE}$ for each pixel pair. The filtered attenuation factor $R_f$ 403 is illustrated by a line. The filtered attenuation factor $R_f$ 403 has been calculated from the attenuation factors 401 using a moving median filter of length seven.

The estimated HE counts 502 illustrated in the embodiment of FIG. 5 have been calculated using the filtered attenuation factor $R_f$ 403 and the measured TE counts 501 as disclosed above. Similarly, the estimated TE counts 406 have been calculated using the filtered attenuation factor $R_f$ 403 and the measured HE counts 404 as disclosed above.

Figure 6:
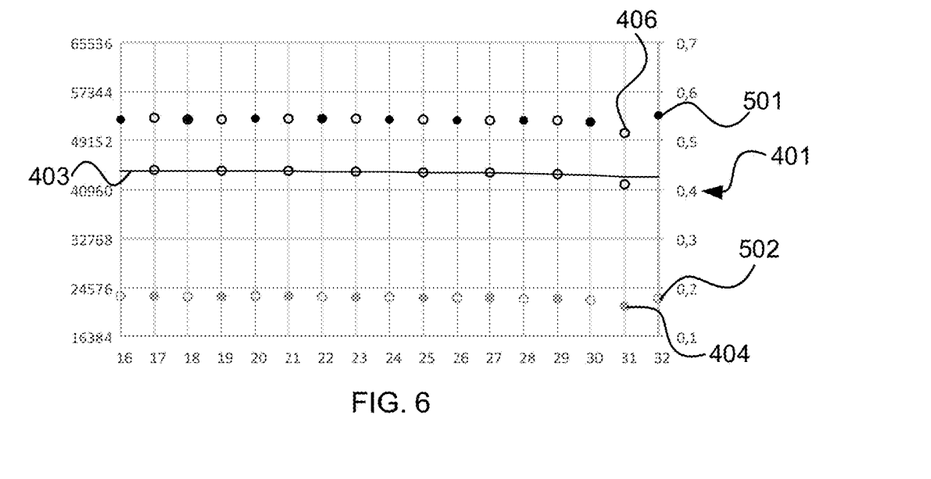
FIG. 6 illustrates a plot representation of TE and HE counts and attenuation factors according to another embodiment.

FIG. 6 illustrates a plot representation of TE and HE counts and attenuation factors according to another embodiment.

The plot illustrated in the embodiment of FIG. 6 represent a subsection of the plot illustrated in the embodiment of FIG. 5.

Figure 7:
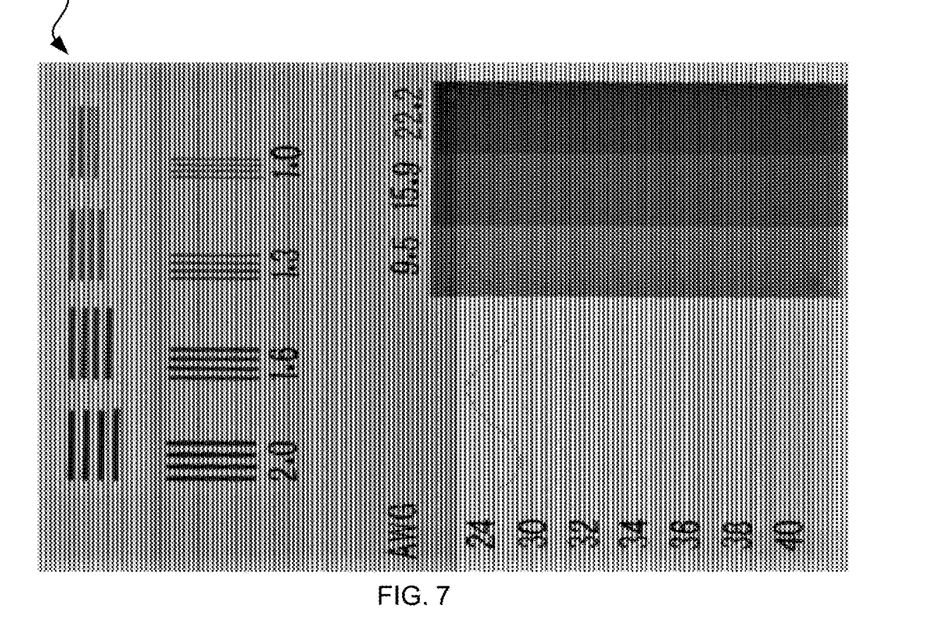
FIG. 7 illustrates a schematic representation of dark-corrected raw data as a grayscale image according to an embodiment.

FIG. 7 illustrates a schematic representation of dark-corrected raw data 700 as a grayscale image according to an embodiment. The raw data 700 corresponds to measured TE and HE counts.

In the embodiment of FIG. 7, horizontally every other column corresponds to measured TE counts and every other column corresponds to measured HE counts. Thus, the horizontal resolution for each energy range is half of the total horizontal resolution of the raw data 700.

Figure 8:
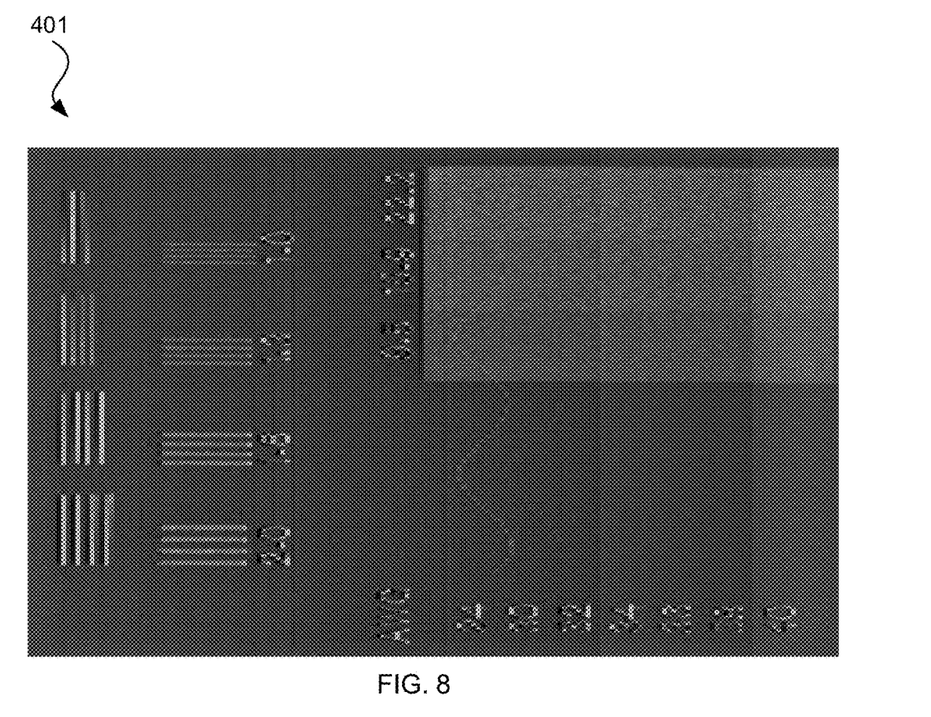
FIG. 8 illustrates a schematic representation of the attenuation factor as a grayscale image according to an embodiment.

FIG. 8 illustrates a schematic representation of the attenuation factor 401 as a grayscale image according to an embodiment.

In the embodiment of FIG. 8, the attenuation factor 401 has been calculated for each horizontal pixel pair in the embodiment of FIG. 7 as disclosed herein.

Figure 9:
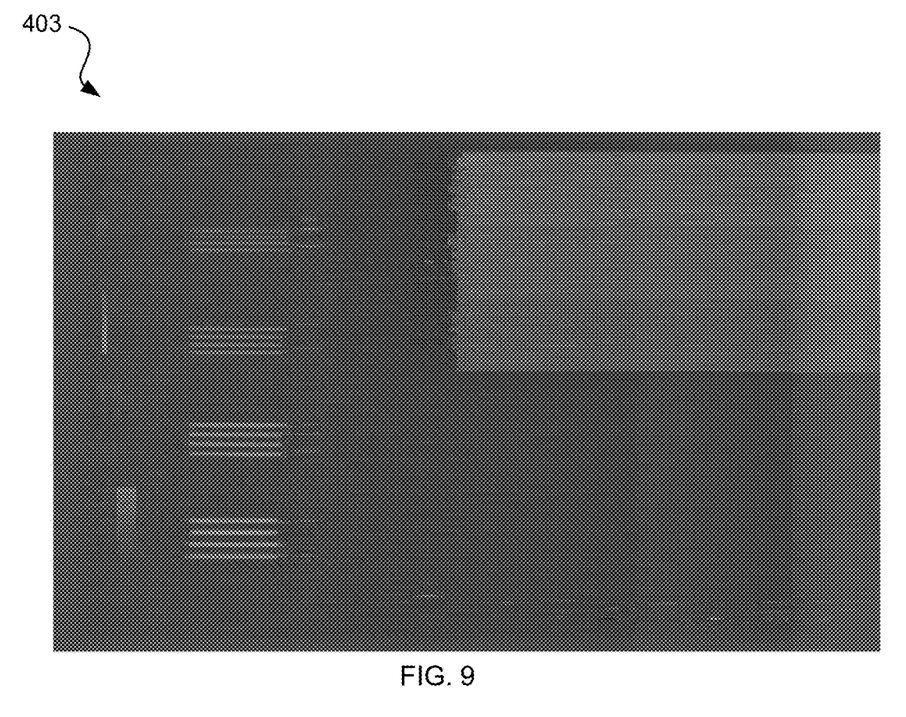
FIG. 9 illustrates a schematic representation of the filtered attenuation factor as a grayscale image according to an embodiment.

FIG. 9 illustrates a schematic representation of the filtered attenuation factor 403 as a grayscale image according to an embodiment.

In the embodiment of FIG. 9, the filtered attenuation factor 403 has been obtained from the attenuation factor of the embodiment of FIG. 8 by filtering in the horizontal direction.

Figure 10:
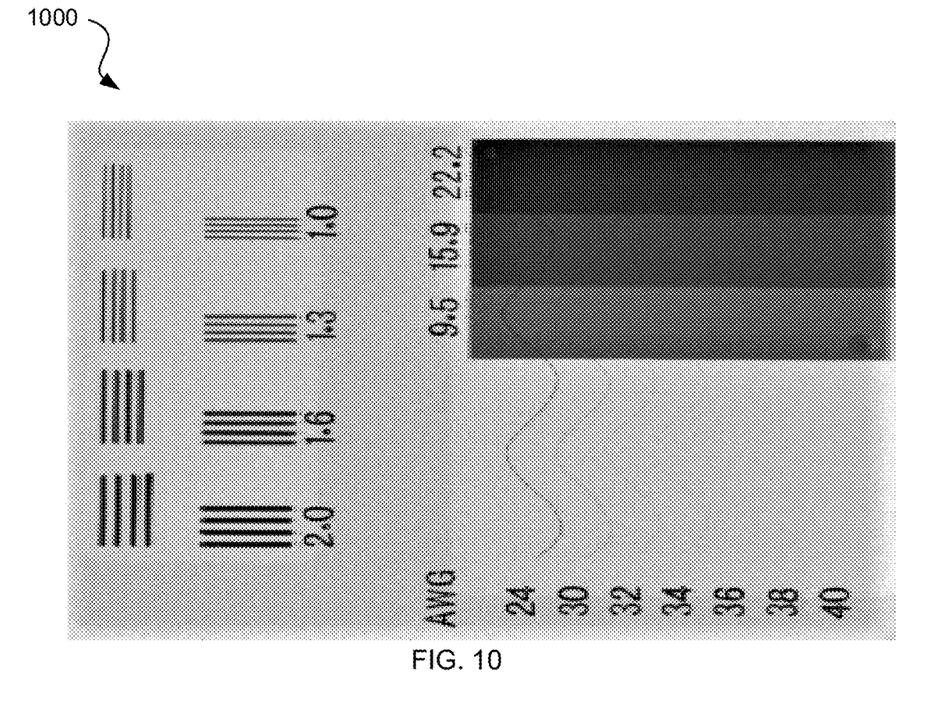
FIG. 10 illustrates a schematic representation of recovered TE output as a grayscale image according to an embodiment.

FIG. 10 illustrates a schematic representation of recovered TE output 1000 as a grayscale image according to an embodiment.

The recovered TE output 1000 can be obtained by using the measured TE columns from the raw data 700 and by calculating estimated TE counts for other columns using the measured HE counts from the raw data 700 and the filtered attenuation factor 403 as disclosed herein.

Figure 11:
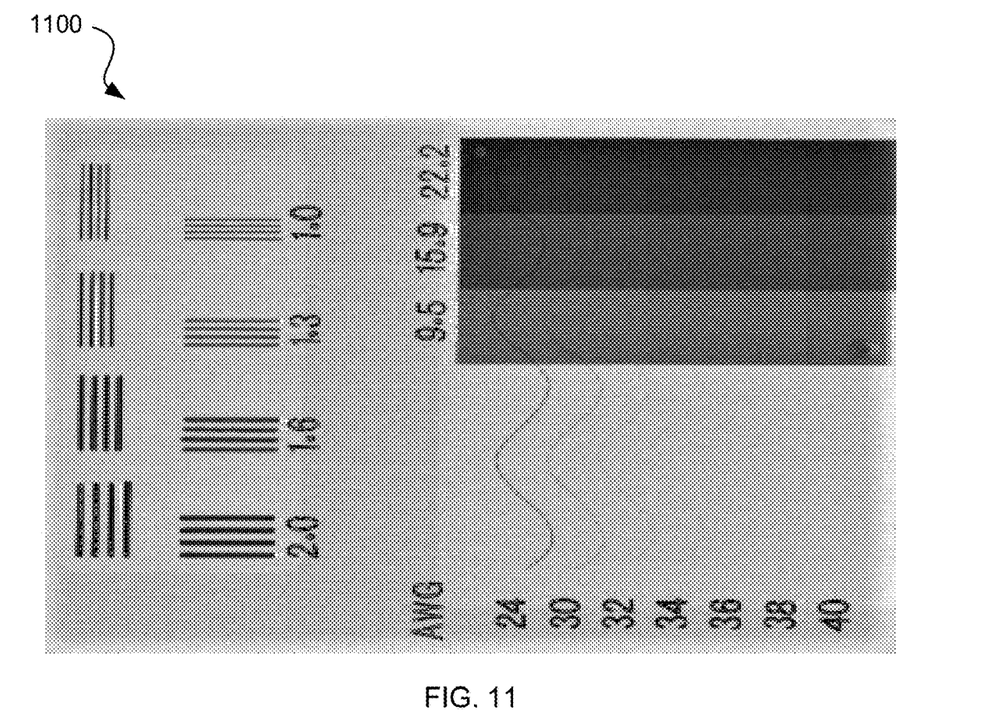
FIG. 11 illustrates a schematic representation of recovered HE output as a grayscale image according to an embodiment.

FIG. 11 illustrates a schematic representation of recovered HE output as a grayscale image according to an embodiment.

The recovered HE output 1100 can be obtained by using the measured HE columns from the from the raw data 700 and by calculating estimated HE counts for other columns using the measured TE counts from the raw data 700 and the filtered attenuation factor 403 as disclosed herein.

Figure 12:
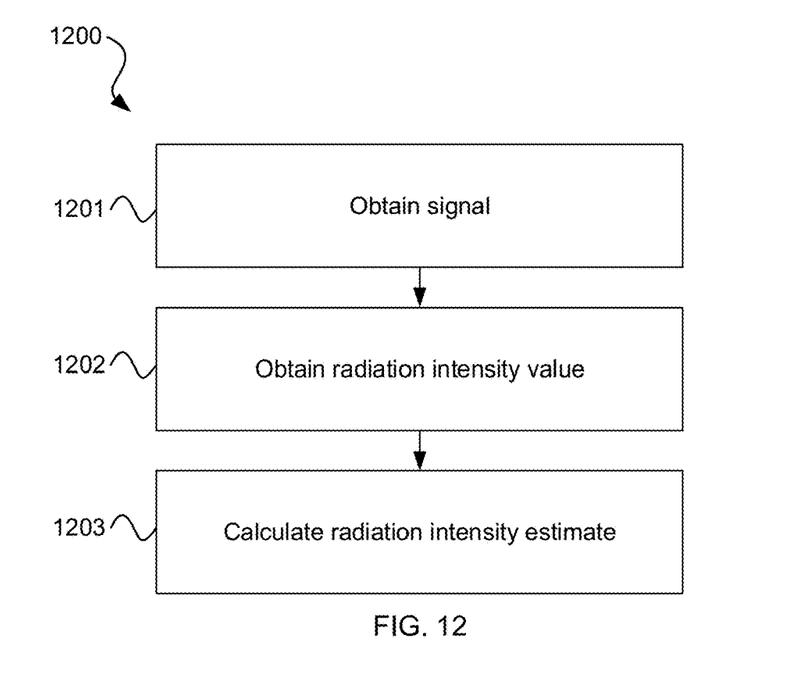
FIG. 12 illustrates a flowchart representation of a method according to an embodiment.

FIG. 12 illustrates a flowchart representation of a method 1200 according to an embodiment.

According to an embodiment, a method 1200 for imaging using a detector comprising a plurality of pixels, wherein the plurality of pixels comprises a first subset of pixels configured to detect incident x-ray or gamma ray radiation in a first energy range and a second subset of pixels configured to detect incident x-ray or gamma ray radiation in a second energy range, wherein the second energy range is a subrange of the first energy range, comprises obtaining 1201 a signal from each pixel in the plurality of pixels.

The method 1200 may further comprise calculating 1202 a radiation intensity value for each pixel in the plurality of pixels based on the signal of each pixel.

The method 1200 may further comprise calculating 1203 a radiation intensity estimate in the first energy range for at least one pixel in the second subset of pixels using the obtained radiation intensity value of the at least one pixel in the second subset of pixels and the obtained radiation intensity values of at least two pixels in the first subset of pixels.

The method 1200 may be performed by, for example, the processing unit 102.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
a detector comprising a plurality of pixels, wherein the plurality of pixels comprises a first subset of pixels configured to detect incident x-ray or gamma ray radiation in a first energy range and a second subset of pixels configured to detect incident x-ray or gamma ray radiation in a second energy range, wherein the second energy range is a subrange of the first energy range; and
a processing unit coupled to the detector, configured to:
obtain a signal from each pixel in the plurality of pixels;
obtain a radiation intensity value for each pixel in the plurality of pixels based on the signal of each pixel;
calculate a radiation intensity estimate in the first energy range for at least one pixel in the second subset of pixels using the obtained radiation intensity value of the at least one pixel in the second subset of pixels and the obtained radiation intensity values of at least two pixels in the first subset of pixels;
calculate the radiation intensity estimate by performing: calculate an attenuation factor for each pixel pair in a plurality of pixel pairs in the plurality of pixels, wherein each pixel pair in the plurality of pixel pairs comprises a pixel in the first subset of pixels and a pixel in the second subset of pixels;

calculate a filtered attenuation factor using a spatial filter and the attenuation factors of the plurality of pixel pairs; and calculate the radiation intensity estimate in the first energy range using the obtained radiation intensity value of the at least one pixel in the second subset of pixels and the filtered attenuation factor.

2. The device according to claim 1, wherein the spatial filter comprises a spatial low-pass filter, a moving average filter, a moving median filter, a weighted median filter, or a gaussian filter.

3. The device according to claim 1, wherein the processing unit is further configured to calculate the radiation intensity estimate in the second energy range for at least one pixel in the first subset of pixels using the obtained radiation intensity value of the at least one pixel in the first subset of pixels and the obtained radiation intensity values of at least two pixels in the second subset of pixels.

4. The device according to claim 1, wherein the detector further comprises a filter arranged to block at least part of the incident x-ray or gamma ray radiation outside the second energy range from entering the second subset of pixels.

5. The device according to claim 4, wherein the filter further comprises a plurality of apertures arranged to allow the incident x-ray or gamma ray radiation to enter the first subset of pixels.

6. The device according to claim 1, wherein the first subset of pixels and the second subset of pixels are spatially arranged into an alternating pattern.

7. A dual energy x-ray or gamma ray imaging apparatus comprising the device according to claim 1.

8. A method for imaging using a detector comprising a plurality of pixels, wherein the plurality of pixels comprises a first subset of pixels configured to detect incident x-ray or gamma ray radiation in a first energy range and a second subset of pixels configured to detect incident x-ray or gamma ray radiation in a second energy range, wherein the second energy range is a subrange of the first energy range, the method comprising:

obtaining a signal from each pixel in the plurality of pixels;

obtaining a radiation intensity value for each pixel in the plurality of pixels based on the signal of each pixel;

calculating a radiation intensity estimate in the first energy range for at least one pixel in the second subset of pixels using the obtained radiation intensity value of the at least one pixel in the second subset of pixels and the obtained radiation intensity values of at least two pixels in the first subset of pixels, wherein calculating the radiation intensity estimate further comprises:

calculating an attenuation factor for each pixel pair in a plurality of pixel pairs in the plurality of pixels, wherein each pixel pair in the plurality of pixel pairs comprises a pixel in the first subset of pixels and a pixel in the second subset of pixels;

calculating a filtered attenuation factor using a spatial filter and the attenuation factors of the plurality of pixel pairs; and calculating the radiation intensity estimate in the first energy range using the obtained radiation intensity value of the at least one pixel in the second subset of pixels and the filtered attenuation factor.

9. The method according to claim 8, wherein the spatial filter comprises a spatial low-pass filter, a moving average filter, a moving median filter, a weighted median filter, or a gaussian filter.

10. The method according to claim 8, further comprising calculating a radiation intensity estimate in the second energy range for at least one pixel in the first subset of pixels using the calculated intensity value of the at least one pixel in the first subset of pixels and the obtained radiation intensity values of at least two pixels in the second subset of pixels.

11. A computer program product comprising program code configured to perform the method according to claim 8 when the computer program product is executed on a computer.

* * * * *